May 13, 1941.   E. SCHWARTZ   2,241,869
EDUCATIONAL DEVICE
Filed June 11, 1940
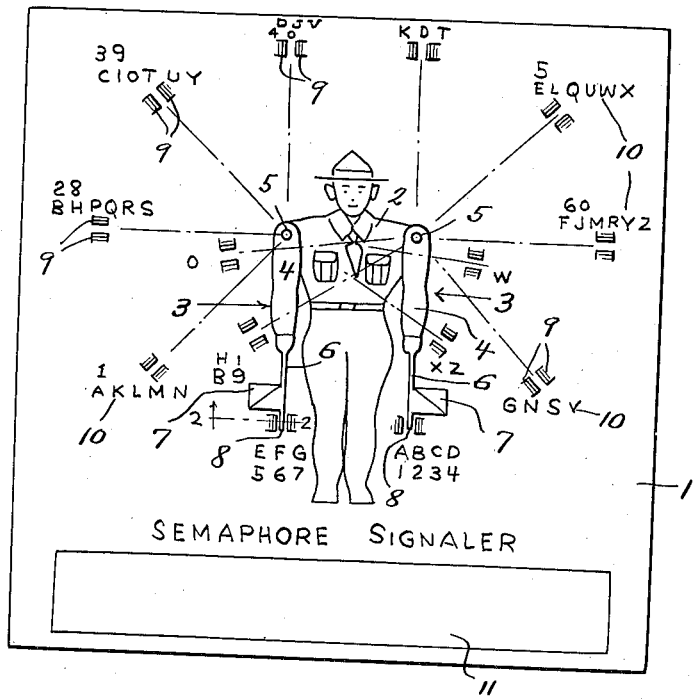
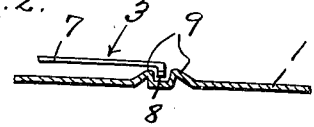
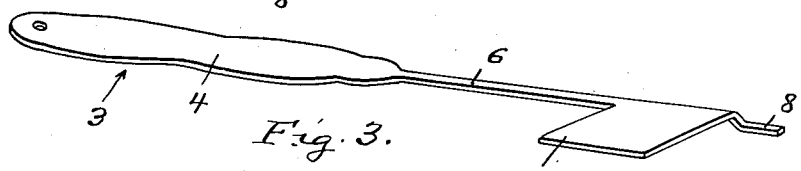
Inventor
Edmund Schwartz
By *Clarence A. O'Brien*
Attorneys Patented May 13, 1941

2,241,869

UNITED STATES PATENT OFFICE 2,241,869

EDUCATIONAL DEVICE

Edmund Schwartz, Corona, N. Y.

Application June 11, 1940, Serial No. 339,961

1 Claim. (Cl. 35—14)

The present invention relates to new and useful improvements in educational devices and has for its primary object to provide, in a manner as hereinafter set forth, an article comprising a novel construction and arrangement for teaching semaphore signaling.

Another very important object of the invention is to provide, in an educational device comprising a pair of pivotally mounted semaphores, unique means for releasably securing said semaphores in the different signaling positions.

Other objects of the invention are to provide an educational device of the character described which will be comparatively simple in construction, strong, durable, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in front elevation of an educational device constructed in accordance with the present invention.

Figure 2 is a fragmentary view in horizontal section, taken substantially on the line 2—2 of Fig. 1.

Figure 3 is a detail view in perspective of one of the semaphores.

Referring now to the drawing in detail, it will be seen that the embodiment of the invention which has been illustrated comprises a substantially square plate 1 of suitable metal, said plate being of any desired dimensions. On the front of the plate 1 is a representation of a uniformed figure, such as a boy scout 2. Pivotally mounted on the front of the plate 1 is a pair of semaphores which are designated generally by the reference numeral 3.

The semaphores 3 include representations of arms 4 which are pivotally secured at 5 to the plate 1 at the shoulder portions of the figure 2. The semaphores 3 further include staffs 6 which are integral with the arms 4, said staffs having formed integrally therewith flags 7. It will be observed that the outer end portions of the staffs 6 project beyond the flags 7, as at 8. It will also be noted that these outer end portions 8 of the staffs 6 are inwardly or rearwardly offset and are adapted to travel on the face of the plate 1. Thus, the semaphores 3 are spaced from the plate 1 with the exception, of course, of the portions 8.

Pressed into the plate 1 are arcuate series of forwardly protruding pairs of abutments 9 which are arranged concentrically with the pivots 5 of the semaphores 3. The pairs of abutments 9 constitute keepers adapted to receive therebetween and releasably secure the semaphores 3. Appropriate code characters 10 are provided on the plate 1 adjacent the pairs of abutments 9 for indicating the significance of the different signaling positions. The lower portion of the plate 1 has defined thereon an area 11 on which suitable instructions or other indicia may be placed.

It is thought that the manner of using the device will be readily apparent from a consideration of the foregoing. Briefly, the semaphores 3 are swung on their pivots 5 to the different signaling positions, in which positions they are releasably secured by engaging the end portions 8 thereof between the pairs of abutments 9. By swinging the semaphores 3 to the different signaling positions and ascertaining the meaning of the code characters 10 adjacent thereto, said positions may be clearly visualized and the significance of each, therefore, more easily memorized. It will be observed that the pairs of abutments 9 are arranged to receive and retain the semaphores 3 when they are swung across in front of the figure 2. The flags 7 are preferably of suitable contrasting colors, such as red and black. Also, the code characters 10 adjacent the series of abutments 9 are preferably colored to conform to the color of the flags 7 which pass thereby.

It is believed that the many advantages of an educational device constructed in accordance with the present invention will be readily understood and although a preferred embodiment of said device is as illustrated and described, it is to be understood that changes in the details of construction may be resorted to which will fall within the scope of the invention as claimed.

What is claimed is:

An educational device comprising a metallic plate having a representation of a human figure thereon, a pair of semaphores pivotally mounted for swinging movement on the plate and including representations of arms pivotally connected to the plate at the shoulder portions of the figure and swingable across said figure, arcuate series of pair of abutments pressed upwardly from the plate concentrically with the axes of the semaphores and comprising oppositely inclined outer surfaces and opposed, vertical inner walls, said semaphores further including staffs on the arms and flags on said staffs, the staffs comprising offset end portions slidable on the plate and engageable selectively between the pairs of abutments for releasably securing the semaphores in signaling positions.

EDMUND SCHWARTZ.